(12) United States Patent
Camus et al.

(10) Patent No.: US 6,216,480 B1
(45) Date of Patent: Apr. 17, 2001

(54) INDEPENDENT AND SELF-SUSTAINED ULTRA EFFICIENT HYBRID POWER GENERATION AND STORAGE SYSTEM METHOD

(75) Inventors: Nelson E. Camus, 1145 W. Newmark Ave., Monterey Park, CA (US) 91754; Stephen John Schwika, Edmonds, WA (US)

(73) Assignee: Nelson E. Camus, Monterey Park, CA (US)

(*) Notice: Subject to any disclaimer, the term of this patent is extended or adjusted under 35 U.S.C. 154(b) by 0 days.

(21) Appl. No.: 09/293,160

(22) Filed: Apr. 16, 1999

(51) Int. Cl.[7] .............................. F25B 27/00; F25B 21/02; H01L 25/00
(52) U.S. Cl. ............................... 62/235.1; 62/3.2; 62/3.7; 136/203; 136/246
(58) Field of Search ................................... 62/235.1, 3.2, 62/3.6, 3.7; 136/203, 206, 246

(56) References Cited

U.S. PATENT DOCUMENTS 4,021,323 * 5/1977 Kilby et al. .
5,197,291 * 3/1993 Levinson .................................. 62/3.2
6,080,927 * 6/2000 Johnson ........................... 136/246 X

* cited by examiner

*Primary Examiner*—William Doerrler
*Assistant Examiner*—Chen-Wen Jiang (57) ABSTRACT

A System for capturing, storing and delivering energy, comprises a capture means (1; 9; 15) for capturing energy; storage means (22) for storing captured energy; and charging means (20, 21; 23, 24, 25, 26) for charging said captured energy into said storage means (22), wherein said capture means (1; 9; 15) provides electrical energy and said storage means is an electrolyte-based rechargeable battery (22) in which the electrolyte comprises adenosine triphosphate (ATP). A Solar panel (1; 9; 15) used in this system comprises reflectors (2, 3; 7, 8) directing reflected photons onto the panel (1; 9). The battery (22) of the system is charged with a battery charger comprising a capacitor (23) and a control circuit (25) for controlling an intermediate charging and discharging process of said capacitor, said method comprising the steps of:

a) during a first period, charging said capacitor to a predetermined level;

b) during a second period much shorter than said first period, discharging said capacitor into said rechargeable battery in the form of at least one pulse;

c) repeating steps a) and b) until the rechargeable battery is sufficiently charged.

15 Claims, 8 Drawing Sheets

INDEPENDENT AND SELF-SUSTAINED ULTRA EFFICIENT HYBRID POWER GENERATION AND STORAGE SYSTEM METHOD

BACKGROUND OF THE INVENTION

The present invention relates to an independent and self sustainable power generation and storage system.

In addition, the present invention relates to a solar panel to be used in the above power generator and storage system and method.

Such systems, composed of known solar panels, rechargeable batteries and control circuitry, are known and have been around for quite some time. However, even with large solar panels and large rechargeable batteries, these known systems, considering the modest amount of storageable energy, require too much time for recharging, thus preventing their breakthrough for some applications or even barring them from many intensive energy applications such as powering vehicles or aircraft.

SUMMARY OF THE INVENTION

According, it is an object of the present invention to provide an independent and self-sustainable highly efficient power generation and storage system. One aspect of the present invention, this object is achieved by a system for capturing, storing and delivering energy, comprising: capture means for capturing energy; storage means for storing captured energy; and charging means for charging said captured energy into said storage means; said capture means, charging means and storage means being appropriately associated to each other; and wherein said storage means may be connected to a load withdrawing energy from said storage means, characterized in that said capture means provides electrical energy and said storage means is an electrolyte-based rechargeable battery in which the electrolyte comprises adenosine triphosphate (ATP).

The addition of adenosine triphosphate (ATP) to the regular rechargeable battery greatly reduces its internal resistance. ATP is an important molecule in the energy metabolism of human cells. The ATP molecule stores energy which can be released in its transition to adenosine diphosphate (ADP). The ATP/ADP conversion is reversible and thus lends itself to applications involving redox processes in rechargeable batteries.

In a preferred embodiment, the electrolyte is based on sulphuric acid, preferably a self-cohesive electrolyte, more preferably a hard-gel electrolyte. This is a low cost, well established battery system. The highly viscous hard-gel electrolyte prevents battery problems if the battery is shaken or tilted.

In another preferred embodiment, the above electrolyte is based on uric acid rather than sulphuric acid. This type of battery can be easily prepared from urine.

Preferably, the electrolyte comprises only dry silica rather than the gel. In this way, the battery can be activated by simply adding water.

Advantageously, the electrolyte further comprises silver/tin alloy salts further improving the battery characteristics.

In a further preferred embodiment, the rechargeable battery is a multicell battery. With each rechargeable battery being composed of a suitable number of cells connected in series, several battery voltages may be achieved.

In another preferred embodiment, each battery cell comprises a porous sheet in the top portion of its housing above the electrolyte, said porous sheet preferably being a glass-type material such as a fiber glass tissue. This sheet prevents water from leaking out of the battery while being permeable to gases such as hydrogen, oxygen or nitrogen which have to be absorbed or released by the battery in some cases. The porous sheet may also be a carbon-based material such as graphite or fullerenes.

Advantageously, said charging means is a battery charger located in a nitrogen containing atmosphere together with said rechargeable battery, said battery charger comprising in its charging line a light emitting element emitting at least part of the frequency spectrum of a black body radiator. This light emitting element, which may be powered by the battery charger, emits photons interacting with the nitrogen in the surrounding atmosphere causing the nitrogen molecules to split into nitrogen atoms which, under the influence of α-particle (helium nuclei) bombardment from the sun and outer space, disintegrate to form hydrogen and oxygen atoms as summarized by the following equation:

$$N + He \rightarrow O + H \tag{1}$$

These two elements will then enter the inventive battery through the above described porous sheets while chemically combining to form water molecules. This process speeds up the battery charging and thus contributes very favorably to the charging process. The nitrogen acts as a "fuel".

More particularly, said light emitting element is an incandescent bulb emitting a continuous emission spectrum which is very effective in stimulating the above splitting of nitrogen.

Preferably, this type of bulb is located close to the porous sheet of each battery cell. In this way, most of the hydrogen and oxygen is formed close to the battery, thus improving the favorable contribution to the charging process.

In some cases, it is appropriate that during the charging process said rechargeable battery and said light emitting element are placed in a pressurized chamber containing gaseous nitrogen. With this higher density of nitrogen molecules/atoms available, the above transmutation of nitrogen yields more hydrogen and oxygen ultimately forming water and entering the battery to be charged.

In a further preferred embodiment, said battery charger comprises a capacitor and a control circuit for controlling an intermediate charging and discharging process of said capacitor, wherein, during the battery charging process, said capacitor is controlled such that it accumulates charge from a charging source during a first period, which charge is then discharged from said capacitor into the rechargeable battery in the form of at least one pulse during a second period much shorter than said first period, this process being repeated periodically until the rechargeable battery is sufficiently charged.

This pulsating charging process causes "clusters" of electrons to be pumped into the battery which again speeds up the charging process and contributes to a fully charged battery.

Preferably, said capacitor is a carbon-aluminum capacitor with aluminum electrodes and carbon material sandwiched therebetween in intimate contact with said electrodes. Again, under the influence of α-particle bombardment, the aluminum atoms of the electrode material of this capacitor are prone to disintegrate into carbon and nitrogen atoms according to the following equation:

$$Al + He \rightarrow C + N \tag{2}$$

where the aluminum serves as a "fuel" just as the nitrogen does in the previous equation.

Advantageously, said carbon material has a porous structure which communicates with the surrounding atmosphere. In this way, after the transmutation of one aluminum atom to one carbon atom and one nitrogen atom, the carbon atom remains in the porous carbon structure whereas the nitrogen atom may exit that porous structure while probably recombining to nitrogen molecules and eventually undergoing the transmutation according to equation (1). In this manner, the aluminum "fuel" both directly and indirectly contributes to the above battery charging.

In a further preferred embodiment, said battery charger comprises a spongy battery having a first electrode of a first material, a second electrode of a second material and spongy material moisted with ATP wherein the electrodes are sandwiched therebetween and in intimate contact with said spongy material. This spongy battery also contributes favorably to the charging process.

Preferably, said first material is a metal under the 14th position of the periodic table of the elements and the second material is a metal over the 14th position of the periodic table of the elements.

Also, said first material may be an alloy of metals with the main metal under the 14th position of the periodic table of the elements and the second material may be an alloy of metals with the main metal over the 14th position of the periodic table of the elements.

In a further preferred embodiment, said capture means comprises at least one solar panel provided with solar cells. This provides an independent energy source.

According to another aspect, the present invention provides a solar panel, preferably for being used in a system as defined in the previous paragraphs, characterized in that it comprises reflectors directing reflected photons onto the panel.

These reflectors enhance the effective light capturing area increasing the number of photons impinging on the solar cells and thus increasing the power output of the panel through an increase of the output current, the output voltage of the panel being fairly constant and depending primarily only on the materials of the pn-junction, the doping levels involved and the junction temperature.

Preferably, said reflectors are a pair of reflector wings hinged to opposite edges of the panel. In this way, the reflector wings may be turned to an optimum angle with respect to the solar panel in use and may also be folded down onto the panel if not in use, thus providing protection against mechanical damage of the panel and making it less bulky for transportation and handling.

Preferably, said reflectors consist of a transparent layer covering a reflecting layer thereunder, such as glass layer with its bottom surface covered with a silver-tin alloy coating.

In a preferred embodiment, said solar panel has a reduced thickness and its back surface covered with a reflecting material such as aluminum, having a low thermal resistance. Due to the reflecting material, photons which did not interact with the pn-junction during their first passage of the reduced thickness solar cell medium may still interact during their second passage, increasing the overall illumination intensity to electrical power conversion efficiency of the solar panel.

In a further preferred embodiment, said back surface is equipped with an electrically powered cooling device in intimate contact with the aluminum layer. As mentioned above, the solar cell junction output voltage decreases with an increase in temperature. Also, and probably worse, the solar cell conversion efficiency drops off with increasing cell temperature. Due to the uniform cooling of the entire solar panel the output voltage on the one hand and the conversion efficiency on the other hand are maintained.

Advantageously, said cooling device is a thermocouple junction operated as a Peltier cooler. This type of "miniature refrigerator" is very compact in size, basically maintenance free and, last but not least, does not involve any environmentally harmful fluorohydrocarbons.

Preferably, said cooling device is powered by part of the electrical output of the solar panel.

The solar panel according to the present invention may be integrated in at least one wall of a refrigerator box with the solar cell on the outside surface of the wall and the cooling device on the inside surface of the wall.

According to yet another aspect, the present invention provides a method for charging energy into a rechargeable battery of a system described above, comprising: a capture means providing electrical energy; a battery charger having a capacitor and a control circuit for controlling an intermediate charging and discharging process of said capacitor; said method comprising the steps of:

a) during a first period, charging said capacitor to a predetermined level;

b) during a second period much shorter than said first period, discharging said capacitor into said rechargeable battery in the form of at least one pulse;

c) repeating steps a) and b) until the rechargeable battery is sufficiently charged.

This pulsating charging method speeds up the charging process of the battery.

Very good results in speeding up the battery charging are achieved when using a high wattage light bulb or even several such bulbs connected in series or in parallel in the charging line, preferably close to the rechargeable battery having a porous cover sheet. As explained above, atmospheric nitrogen under the influence of the intensive photon radiation from the bulb(s) as well as under the influence of cosmic $\alpha$-particle bombardment very favorably contributes to the accelerated battery charging.

Even better results are achieved if the capacitor of the battery charger is a carbon-aluminum capacitor. Again, under the influence of cosmic $\alpha$-particle bombardment the aluminum serves as a "fuel" providing additional energy for the battery charging.

In summary, the above system for capturing, storing and delivering energy, with the above solar panel being used as the capture means and using the above method for charging energy into the rechargeable battery of the system constitutes a truly hybrid system for capturing energy, since it captures "solar" energy in a broader sense:

1) photon energy from solar (classically speaking) radiation;

2) nuclear energy from nitrogen and aluminum nuclei activated by solar $\alpha$-particles.

EXAMPLES OF SYSTEM COMPONENTS

ATP battery electrolyte:

| Version 1) | - sulphuric acid (gravity 1.300): | 70.5% |
| --- | --- | --- |
| | - silver/tin alloy salts: | 2.5% |
| | - adenosine triphosphate* (ATP): | 12.0% |
| | - dry silica (optional): | 15.0% |
| Version 2) | - concentrated urine | |
| | - bicarbonate | |
| | - sodium sulfate | |
| | - potassium hydroxide | |
| | - adenosine triphosphate* (ATP) | |
| | - dry silica (optional) | |

*in dynamic equilibrium with adenosine diphosphate (ADP), with ATP/ADP ratio depending on degree of battery charging The added ATP/ADP minimizes the electrical resistance of the electrolyte.

The hard-gel electrolyte due to the dry silica may be diluted, as required, with distilled water to get a liquid of the required viscosity that can be filled in each cell of the battery, each cell yielding approximately 2 volts.

The thin sheet of fiber glass tissue in the top portion of each battery cell, covering the total upper surface of the cell just in direct contact with the positive and negative plates minimizes the escape of hydrogen and oxygen gases with the reformation of water inside each cell during the charging and discharging cycles.

Battery charger

The battery charger (Hyper Booster Controller) uses rectifier silicon diodes in the electronic circuitry, improving the battery charging efficiency during a time delay of 6 seconds followed by the electron cluster discharge into the ATP battery and also maintains the internal (supportive, auxiliary) batteries totally activated all the time. The discharge of electron clusters to the storage battery every 6 seconds with the help of samll (supportive) batteries pushes down the current from the solar panels.

Each rectifier silicon diode produces a voltage drop of 0.45 volts, maintaining the current in the electronic circuitry constant. Preferably, several rectifier silicon diodes are connected in series to maintain the RMS average power in the electron flow in order to charge respective batteries.

The internal carbon-aluminum capacitor is connected in parallel with the terminals of the internal small (auxiliary) batteries and/or the external small batteries used in the control circuitry. In addition, they are connected to the positive output of the solar panel together with the anode terminal of the series of rectifier silicon diodes whose final cathode terminal of the series is directly connected to the positive terminal output of the control circuitry. All the negative terminals of each component are connected together.

The electronic circuitry is to detect the storage status of the battery to be charged, adjusting by itself the time delay and lapse of time in the discharge of the electron flow clusters (pulses).

The spongy battery composed of the flat sandwich of the two different alloys of metals separated with a thin spongy paper moisted with ATP can be activated by any existing source of electric power.

The battery charger using the light charging principle has one rectifier diode of 600 V.p.e.p./ 3 amps connected in series with one or more incandescent light bulbs having a power consumption of more than 10 watts and a nominal voltage of 10 to 400 volts at 50 to 60 Hz AC, also in series with the battery to be formed or charged, closing the circuit with the 110–220 V.A.C. supply from the utility grid. This set-up of the light battery charger more than doubles the efficiency of the battery during the discharging cycle. Particularly, it reduces the heat dissipation and bubble formation in the surface of the liquid lead acid battery during the formation process in the factory, reducing production costs and minimizing health hazards to factory workers.

Further advantages of the present invention are:
  reducing the manufacture and shipment costs of the power generation and storage system
  maximizing existing solar electric conversion efficiencies
  reducing the risks involved in transporting hazardous materials such as liquid lead-acid batteries
  reducing battery manufacture costs
  preventing the deterioration of food
  providing dependable computer back-up
  providing efficient source for daily and/or emergency power lights, television and radio receivers and transmitters,
  compensating for extended interruptions of utility power The present invention as set forth above and in the appended claims as well as additional features, advantages and applications thereof will be best understood from the following description of preferred embodiments when read in connection with the accompanying drawings.

BRIEF DESCRIPTION OF THE DRAWINGS

FIG. 1–A is a perspective view of another wing-equipped solar panel;

DETAILED DESCRIPTION OF THE PREFERRED EMBODIMENTS

Figure 1:
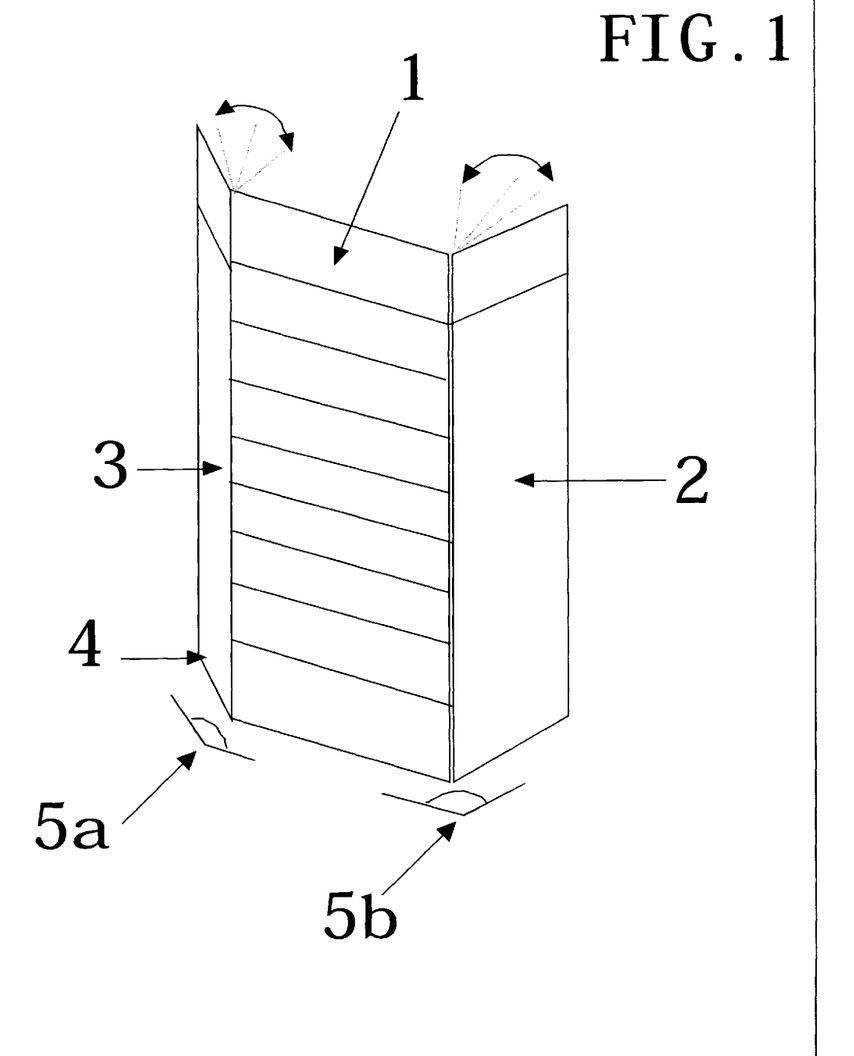
FIG. 1 is a perspective view of a reflector wing type solar panel according to the present invention.

Referring to FIG. 1, a solar panel 1 having a right reflector wing 2, a left reflector wing 3 and a frame 4 is shown. The right reflector wing 2 forms a right aperture angle 5b and the left reflector wing 3 forms a left aperture angle 5a with respect to the plane defined by the solar panel 1. Both reflector wings 2, 3 concentrate more solar power/intensity (number of photons per unit area) onto the solar panel 1, thus enhancing its electrical power output.

Referring to FIG. 1–A, another solar panel 9 having a right reflector wing 6 and a left reflector wing 7 is shown. In addition, this solar panel 9 has a flat aluminum sheet 8 having a thickness of 3.2 mm (⅛"). The reflector wings 6, 7 are hinged to the solar panel 9 by metal hinges 10a, 10b, 10c and 10d, 10e, 10f, respectively. Aluminum being a good thermal conductor, the aluminum sheet 8 contributes to a uniform temperature distribution over the solar panel 9, preventing internal voltage differences which might cause damage to the solar panel due to internal currents.

Figure 2:
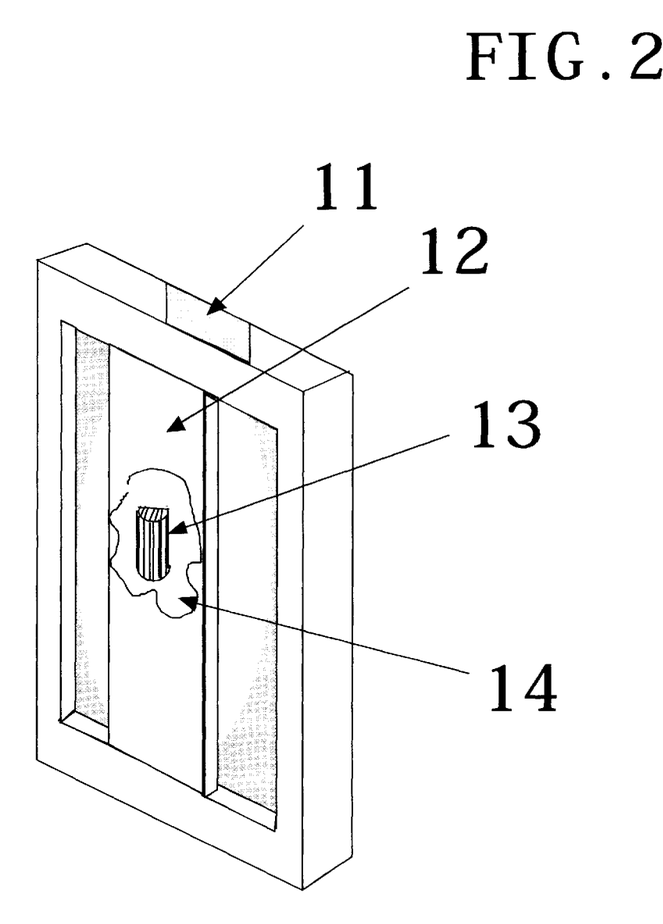
FIG. 2 is a perspective view of a solar panel with a thermo-couple Peltier cooler mounted thereon.

Referring to FIG. 2, yet another solar panel equipped with an aluminum sheet having a first side 11 and a second side 12 is shown. A thermo-couple junction 13 is attached to the second side 12 of the aluminum sheet 11, 12 by an adhesive contact 14. The thermocouple junction 13 is operated as a Peltier cooler with its cold side attached to the aluminum sheet. Thus, due to its good thermal conductivity, the aluminum sheet 11, 12 acts as a heat sink cooling the solar panel. Again, the thickness of the aluminum sheet is 3.2 mm (⅛").

Figure 3:
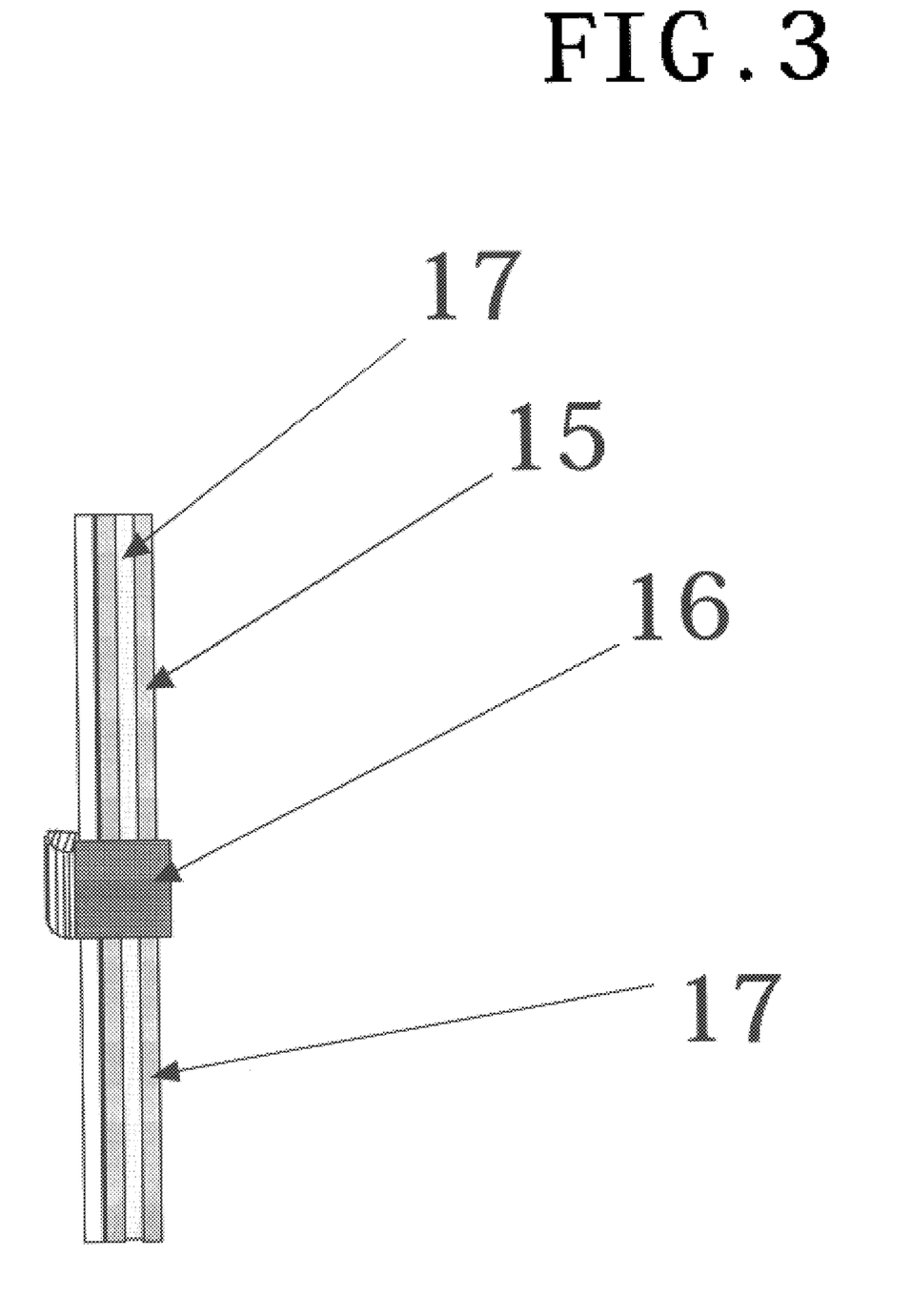
FIG. 3 shows a lateral cross section of a further solar panel with a thermo-couple Peltier cooler.

Referring to FIG. 3, a cross section of a further solar panel 15 is shown. A thick piece of aluminum 16 extends across the panel, providing thermal contact between the Peltier cooler and the solar panel 15. The aluminum sheet 17 is arranged on both sides of the solar panel 15.

Figure 4:
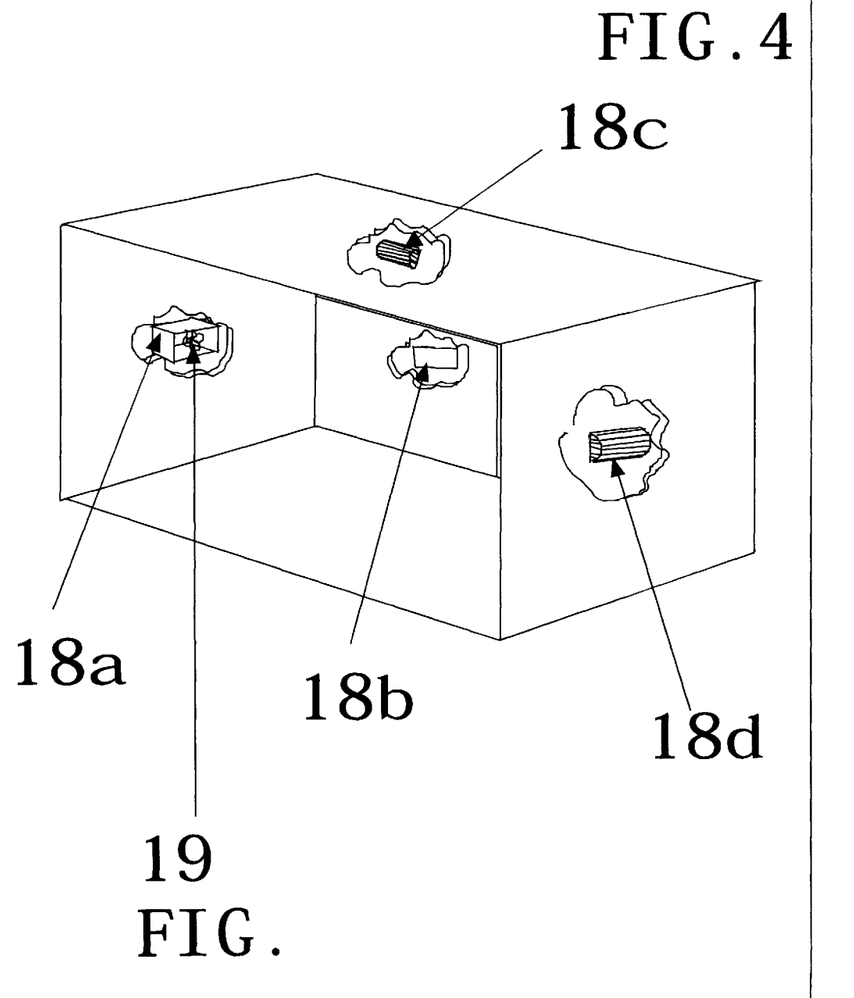
FIG. 4 is a front perspective view of a solar refrigerator comprising four thermo-couple Peltier coolers and one blower.

Referring to FIG. 4, a solar refrigerator having four walls each with a Peltier cooler 18a, 18b, 18c and 18d is shown. In addition, one of the four walls has a blower 19 mounted thereon. At least one of the four walls is provided with a solar panel to power the four Peltier coolers and the blower.

Figure 5:
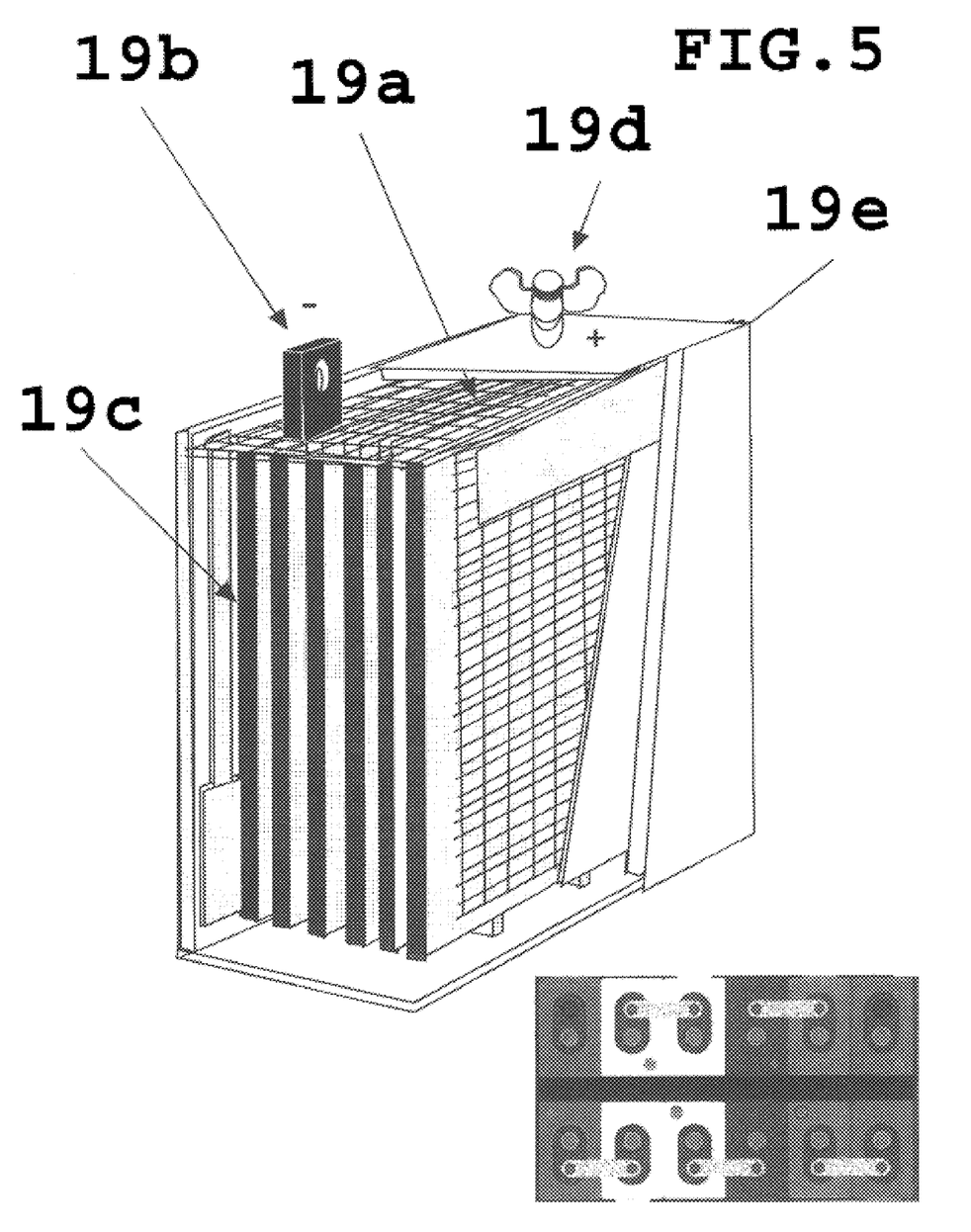
FIG. 5 is a front perspective view of one single cell of an ATP (adenosine triphosphate) battery according to the present invention, with its housing partly broken away, showing a thin sheet of fiber glass tissue covering the upper surface of the cell directly contacting the negative and positive plates.

Referring to FIG. 5, a front perspective view of one single cell of an ATP (adenosine triphosphate) battery according to the present invention is shown, with its housing partly broken away, showing a thin sheet of fiber glass tissue 19A covering the upper surface of the cell, directly contacting the positive plate 19C and the negative plate 19E of the cell. The negative electrode terminal 19B extends through the fiber glass tissue cover 19A and the positive electrode terminal 19D is connected to the housing of the single cell ATP battery.

Figure 6:
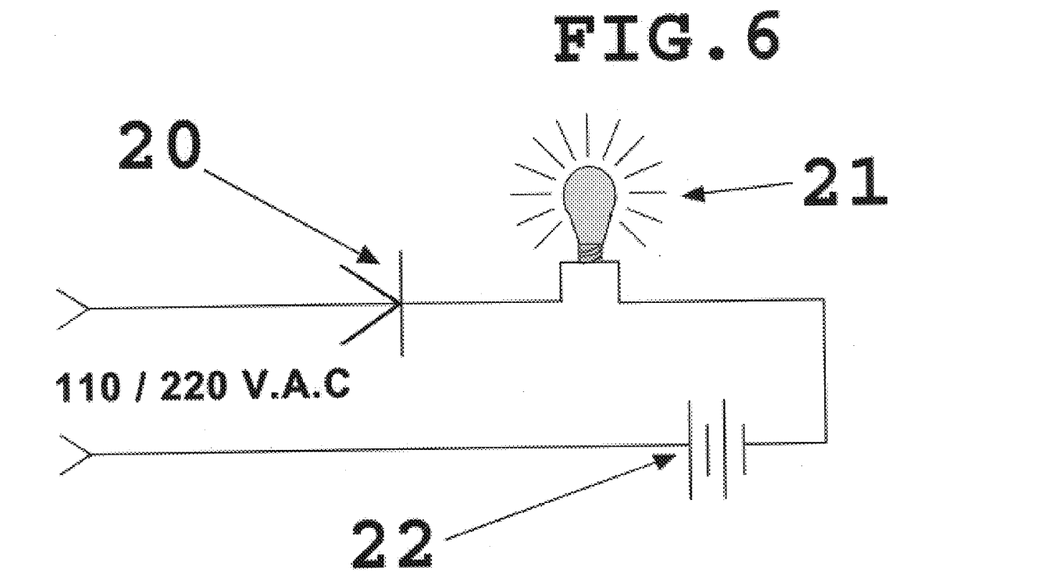
FIG. 6 is a simplified schematic wiring diagram of a battery charger including a continuous spectrum light emitting element according to the present invention.

Referring to FIG. 6, a simplified schematic wiring diagram of a battery charger including a rectifier diode 20 for half wave rectification and a high wattage light bulb 21 emitting a continuous spectrum of light is shown. The battery to be charged 22 is an ATP battery as shown in FIG. 5. The inventive ATP battery which may have an electrolyte based on sulphuric acid, uric acid or a similar acid, can be more rapidly charged with the inventive light battery charger if the light bulb 21 is on. Of course, the inventive battery charger could have a more sophisticated rectifier unit permitting full wave rectification, smoothing, etc.

Figure 7:
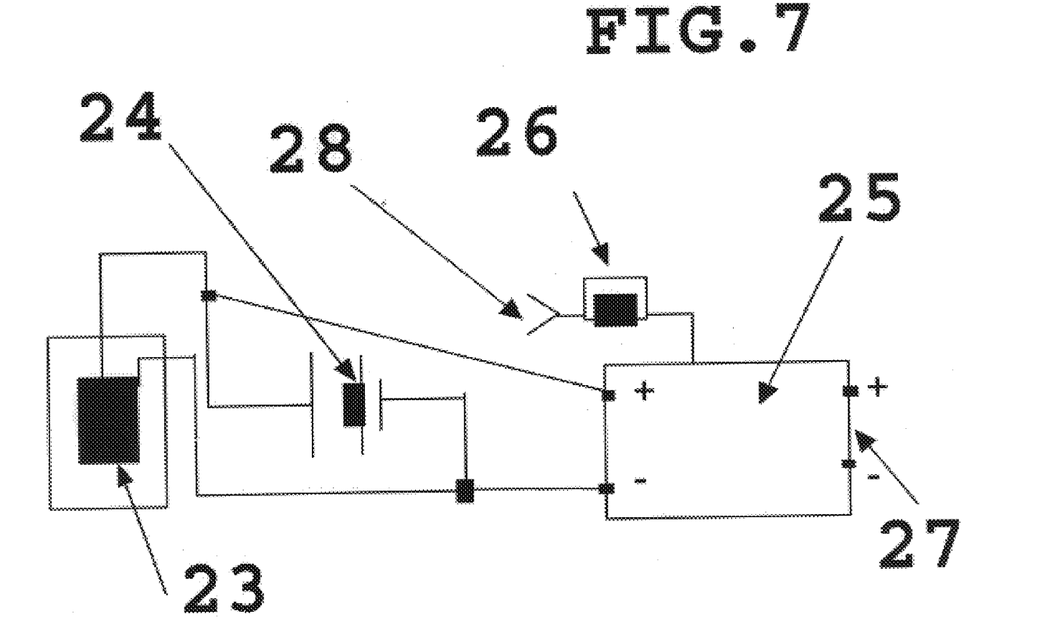
FIG. 7 is a simplified schematic wiring diagram of another battery charger including an external energy source (e.g. small battery), a capacitor for intermediate charging as well as charging control circuitry.

Referring to FIG. 7, a simplified schematic wiring diagram of another battery charger (Hyper Booster Controller) including a carbon-aluminum capacitor 23 for intermediate charging, a small battery 24 as an internal and/or external supportive energy source as well as charging control circuitry 25 is shown. In addition, a rectifier silicon diode 26 is provided in the power input line to the charging control circuit 25. A solar panel (not shown) as a major energy source is connected with its output to the positive input terminal 28. The ATP battery to be charged (not shown) is to be connected to the positive and negative output terminals 27 of the charging control circuit 25. The control circuit 25 causes periodic charging of the ATP battery. Each period is composed of a first period and a second period. During the first period, the carbon-aluminum capacitor 23 is charged from the solar panel through the control circuit 25. During the subsequent second period, the carbon-aluminum capacitor 23 is discharged in one or more pulses into the ATP battery again through the control circuit 25. All negative terminals of each component are connected together.

Figure 8:
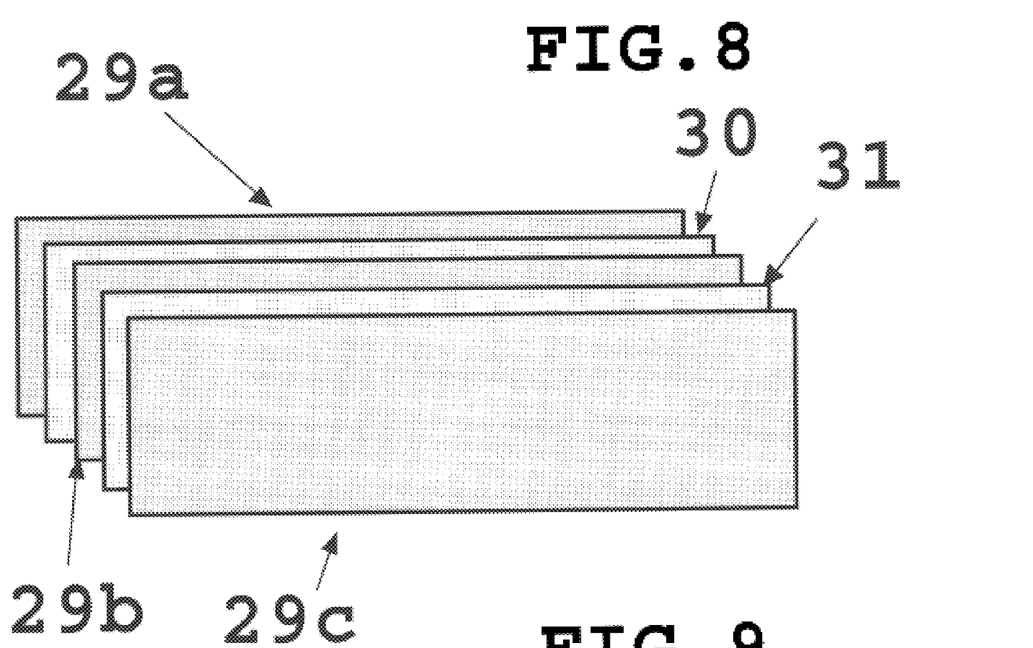
FIG. 8 is an exploded view of a spongy battery with three spongy papers moisted with adenosine triphosphate (ATP) alternating with two metal sheets (positive and negative), each of which consisting of a different metal or metal alloy.

Referring to FIG. 8, an exploded view of a flat sandwich-type spongy battery (Electron Organizer) with three spongy papers 29a, 29b, 29c moisted with adenosine triphosphate (ATP) alternating with two metal sheets 30, 31 (negative and positive), each of which consisting of a different metal or metal alloy, is shown. The metal sheet 30 is formed of a metal under the 14th position in the periodic table and acts as a negative pole whereas the metal sheet 31 is formed of a metal over the 14th position in the periodic table and acts as a positive pole.

Figure 9:
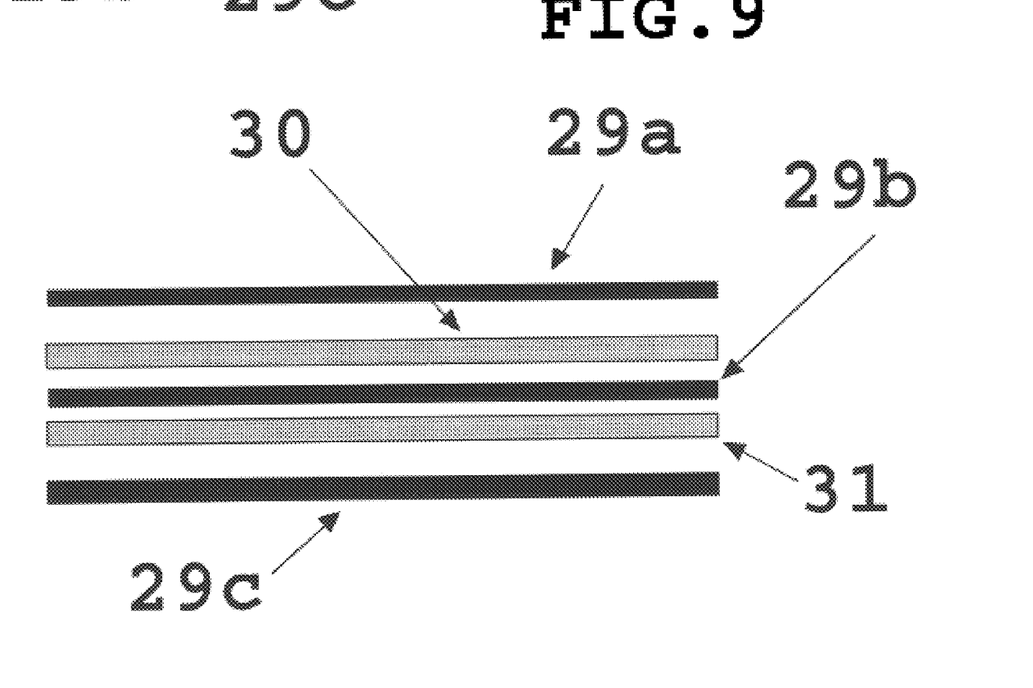
FIG. 9 is a lateral cross sectional view of the spongy battery of FIG. 8.

Referring to FIG. 9, a lateral cross sectional view of the spongy battery of fig. 8 is shown with the negative plate 30, the positive plate 31 and the ATP moisted spongy papers 29a, 29b, 29c surrounding the plates 30, 31.

What is claimed is:

1. A self-sustainable ultra efficient hybrid power generation and storage system; with advanced "light charging/ producing" utility power grid backup including a solar refrigerator utilizing high efficiency solar electric or alternative energy production for conventional residential, commercial, electric vehicle, and emergency power requirements, comprising:

a. a solar panel to said hybrid power system, characterized in that it comprises a pair of reflector wings, directing reflected photons onto the panel;

b. the reflector wings covered on at least one surface with a water-proof silver-tin alloy paint;

c. an electric Peltier Cooler Thermo-couple junction, connected in direct contact with the back center of the solar panel;

d. a blower mounted in front of one of the cooler junctions;

e. the Peltier Cooler Thermo-couple junctions are connected in series to the DC power input;

f. an ATP (adenosine tri-phosphate) battery with the usage of a self cohesive-gel electrolyte, the electrolyte is based on uric/sulphuric acid;

g. the ATP battery uses a dry silica comprising silver/tin alloys;

h. the ATP battery has a thick sheet of fiber glass tissue internally on the top surface of each cell;

I. a controller uses a large capacity carbon-aluminum capacitor in connection with the rectifier in the electric circuit;

j. the controller using an electronic circuitry to switch and discharge the maximum power stored in a large capacitor.

2. A hybrid power generation and storage system according to claim 1 further comprising a flat aluminum sheet covering 75% of the back surface of the solar panel.

3. A hybrid power generation and storage system according to claim 2, the pair of reflector wings use a solar controlled motorized tracking system.

4. A hybrid power generation and storage system according to claim 3, the solar electric-powered refrigerator includes 4 units of Peltier Cooler Thermo-couple junctions.

5. A hybrid power generation and storage system according to claim 4 further comprising a light battery charger, whose electric configuration includes a rectifier diode, connected in series with paralleled high consumption light bulbs, completing the series with the batteries to be charged and closing the circuit with an AC power.

6. A hybrid power generation and storage system according to claim 5, the ATP battery has a composition of 3–6 single cells (6–12 Volts) with external connection in series like a modular cell pack.

7. A hybrid power generation and storage system according to claim 6, the controller is a Hyper-Boost controller.

8. A hybrid power generation and storage system according to claim 7 further comprising a Electron Organizer using a flat sandwich of two different alloy of metals separated by a thin spongy paper moisted with adenosine tri-phosphate, connected with an electronic circuit, to an instant powered battery.

9. A hybrid power generation and storage system according to claim 1 further comprising a flat aluminum sheet covering 75% of the back surface of the solar panel.

10. A hybrid power generation and storage system according to claim 1, the pair of reflector wings use a solar controlled motorized tracking system.

11. A hybrid power generation and storage system according to claim 1, the solar electric-powered refrigerator includes 4 units of Peltier Cooler Thermo-couple junctions.

12. A hybrid power generation and storage system according to claim 1 further comprising a light battery charger, whose electric configuration includes a rectifier diode, connected in series with paralleled high consumption light bulbs, completing the series with the batteries to be charged and closing the circuit with an AC power.

13. A hybrid power generation and storage system according to claim 1, the ATP battery has a composition of 3—6 single cells (6–12 Volts) with external connection in series like a modular cell pack.

14. A hybrid power generation and storage system according to claim 1, the controller is a Hyper-Boost controller.

15. A hybrid power generation and storage system according to claim 1 further comprising a Electron Organizer using a flat sandwich of two different alloy of metals separated by a thin spongy paper moisted with adenosine tri-phosphate, connected with an electronic circuit, to an instant powered battery.

* * * * *